May 23, 1967 P. HEMENWAY 3,320,971

MULTIPLE BALL CHECK VALVE

Filed Aug. 5, 1963

INVENTOR.
PHILIP HEMENWAY
BY Joseph A. Hill
ATTORNEY

United States Patent Office 3,320,971
Patented May 23, 1967

3,320,971
MULTIPLE BALL CHECK VALVE
Philip Hemenway, 12625 42nd Ave. S.,
Seattle, Wash. 98168
Filed Aug. 5, 1963, Ser. No. 300,115
3 Claims. (Cl. 137—512.1)

The invention described herein may be manufactured and used by or for the Government for governmental purposes without the payment to me of any royalty thereon.

The invention relates generally to improvements in multiple ball check valves.

In gas and air ducts there is a likelihood of a sudden pressure build-up within a duct or conduit. There is a need for a means for controlling the sudden high pressure build-up in a conduit in a manner that is not injurious to the conduit structure. This problem can be solved by means of a multiple ball check valve means within the conduit which will offer comparatively small resistance to regular gas flow in the conduit and at the same time offer high resistance to a sudden pressure build-up in a manner to control the pressure and completely cut off gas flow in the conduit.

The primary object of this invention is to provide a multiple ball check valve within the stream of air flow in a duct or conduit which has small resistance to ordinary air flow while having high resistance to a high pressure surge or flow.

It is a further object of the invention to provide in a multiple ball check valve a pressure responsive plate member which is movable during a sudden increase in pressure of fluid through the valve and which member will be retained in position until released when the sudden pressure increase has dissipated.

Further objects of the invention will become apparent as the description proceeds, and the features of novelty will be pointed out in particularity in the course of the following description and in the appending claims.

FIG. 1 discloses a sectional view of one embodiment of the invention;

FIG. 2 discloses a sectional view of another embodiment of the invention in which a movable rebound baffle is used;

Throughout the drawings, like reference numerals are utilized to designate like parts.

Fuild flow as defined in this specification may pertain to flow of a liquid, gas or air.

Figure 1:
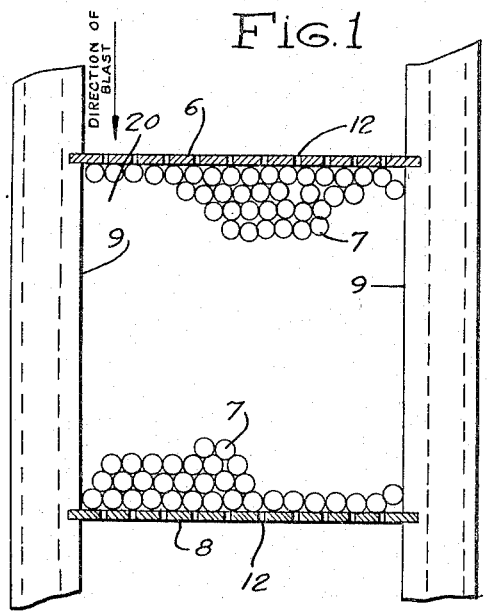

Referring to FIG. 1, the multiple ball check valve means consists of a perforated retaining grill 8 and rebound grill 6, both of proper strength and placed as shown in air duct 9. The ball check members 7 may be balls or other shapes and are of silicone material or any other desired material of a suitable weight and elasticity as required. Valve chamber means 20 contains balls 7 and is enclosed by duct 9, and grills 6 and 8, as shown.

In operation, FIG. 1, the air or gas flows through multiple orifices 12 of grills 6 and 8 and through spaces between the balls which offer relatively low resistance to usual air velocities of flow, but offer extremely high resistance to the high rates of flow that occur during a blast. During the blast the pressure behind the balls squeeze the balls so that the voids between the balls are still smaller which increases the resistance to air flow at higher velocities. This arrangement of structure in FIG. 1 is such that balls 7 may completely shut off the air flow when the differential air pressure reaches a certain value. Rebound grill 6 confines balls 7 to their proper place in chamber 20. With no blast condition, the perforated rebound grill 6 and its adjacent attached parts are supported by the elastic balls 7. The voids between balls 7 are sufficient to allow a designated quantity of air to travel through the valve at a designed pressure drop.

Figure 2:
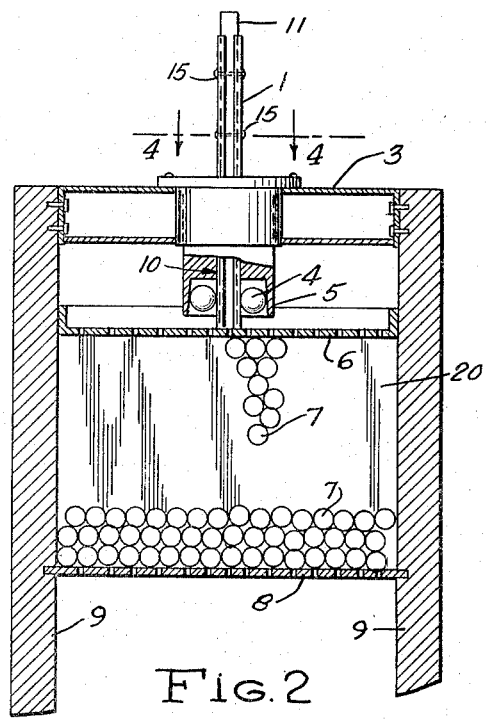
Figure 4:
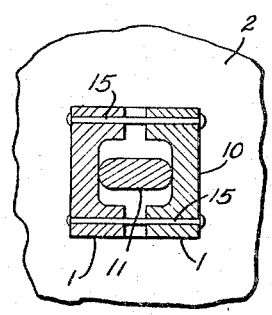
FIG. 4 is a view taken on line 4—4 of FIG. 2.
Figure 3:
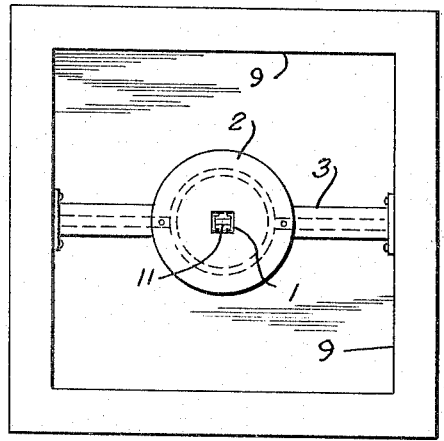
FIG. 3 is a plan view of the movable rebound baffle and support of FIG. 2.

In FIG. 2, like FIG. 1, the valve consists of multiple orifice grill 8, duct 9, balls 7, rebound grill 6 being actuated automatically or manually by a latch or releasable holding means. The latch or releasable holding means comprises the sprag rollers 4 within a housing 5 having an internal taper of such angle that the sprag rollers can lock the guide yoke 1 when a sudden blast or pressure increase moves the rebound grill 6 downward.

During operation of FIG. 1 when a sudden blast or increase of pressure is applied to the ball check valve the balls are moved in the direction of the flow and are compressed to an extent depending upon the magnitude of the blast or pressure increase. If the pressure increase is great enough the balls may be compressed to such an extent that the flow is completely cut off.

During operation of FIG. 2 when a blast occurs, the pressure differential of the flow becomes increased in duct 9, and balls 7 tend to squeeze more tightly together. The pressure differential could continue to increase until balls 7 completely close the voids. If the voids are closed, any further pressure differential increase would not cause an increase of pressure on the down stream side of the valve. At the same time this blast would tend to push on the rebound grill 6. Grill 6 would then travel downward. Rollers 4 would allow guide yoke 1 to go along with rebound grill 6. Guide yoke 1 is fastened to rebound grill 6 in such a way that it can also slide radially with respect to the longitudinal centerline of the release bar 11. Guide yoke 1 slides within the guide bearing means 10. By this operation, when the pressure of the blast has been dampened, released or dissipated, balls 7 tend to push rebound grill 6 upward. However, grill 6 is held in its downward position by rollers 4. By turning release bar 11 with a wrench, the valve is reset to its original position.

Fasteners 15 of a sliding type may be arranged along the portion of the guide yoke 1 which projects above plate 2 so that the guide yoke can slide on them as well as sliding in the guide bearing 10.

It is to be understood, that this invention is not limited to the particular details of construction set forth in the foregoing specification and illustrated in the accompanying drawings, as the same refer to and set forth only certain embodiments of the invention, and it is obvious that the same may be modified, within the scope of the appended claims, without departing from the spirit and scope of the invention.

I claim:

1. A multiple ball check valve means comprising an air duct means, a perforated ball retaining grill means secured across the air flow within said duct means, a cooperating ball rebound grill means including variable releasable holding means comprising a rotatable bar of elongated transverse cross-section, cooperating with a guide yoke mounted in said duct means for movement with and in the direction of movement of said rebound grill, and connected thereto, said rebound grill means being positioned in substantially parallel relationship to said retaining grill means in said duct means, and a plurality of elastic rebound ball members variably positioned at random between the two grill means to rebound on sudden impact with said rebound grill means to dampen, dissipate and cut off air flow during sudden pressure increases without said duct means.

2. The multiple ball check valve means of claim 1 wherein said releasable holding means comprises, a guide bearing means mounted across said duct means, a guide yoke passing through said guide bearing means, one end of said guide yoke attached to said rebound grill, a release bar housed within said guide yoke, said release bar coacting with said yoke to produce bearing pressure against said bearing means to operably positioned said rebound grill within said duct means.

3. A unitary multiple valve means for a fluid conduit means comprising a fluid inlet means, a common container means having therein a common valve chamber means communicating with said inlet means, one wall of said container means including a perforated retaining grill means and another wall of said container including a cooperating grill means including releasable holding means, a plurality of elastic rebound ball members in said chamber means variably positioned in said chamber between the said two grill means; said releasable holding means including cooperating reciprocating rod means and guide means, cooperating fastening means, roller means cooperating with said rod means and a frame means cooperating with said roller means; said ball means being of such size, elasticity and weight that said ball means produce low resistivity to normal fluid flow at low velocities and very high resistivity to fluid flow at instantaneously high velocities.

References Cited by the Examiner
UNITED STATES PATENTS

| | | | |
|---|---|---|---|
| 262,718 | 8/1882 | Young et al. | 74—162 X |
| 2,090,727 | 8/1937 | Gosmann. | |

WILLIAM F. O'DEA, *Primary Examiner.*

ISADOR WEIL, *Examiner.*

D. ZOBKIW, *Assistant Examiner.*